United States Patent
Shen et al.

(10) Patent No.: US 6,768,224 B2
(45) Date of Patent: Jul. 27, 2004

(54) POWER SUPPLY SYSTEM

(75) Inventors: Cheng-Lai Shen, Taipei (TW); Yueh-Chih Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 10/212,076

(22) Filed: Aug. 6, 2002

(65) Prior Publication Data

US 2003/0025396 A1 Feb. 6, 2003

(30) Foreign Application Priority Data

Aug. 6, 2001 (TW) ........................................ 90213347 U

(51) Int. Cl.[7] ................................................ H02J 1/00
(52) U.S. Cl. ........................................................ 307/64
(58) Field of Search ............................. 307/43, 64, 83, 307/85, 86; 700/12, 22; 713/300, 320

(56) References Cited

U.S. PATENT DOCUMENTS

| | | | | |
|---|---|---|---|---|
| 4,381,457 A | * | 4/1983 | Wiles | ........................ 307/64 |
| 5,565,714 A | * | 10/1996 | Cunningham | ................ 307/112 |
| 5,668,417 A | * | 9/1997 | Wiscombe et al. | ........... 307/64 |
| 5,825,100 A | * | 10/1998 | Kim | ............................. 307/66 |
| 5,974,551 A | * | 10/1999 | Lee | ............................. 713/300 |
| 6,128,744 A | * | 10/2000 | Wang | .......................... 713/300 |
| 6,295,217 B1 | * | 9/2001 | Yang et al. | .................... 363/49 |
| 6,430,692 B1 | * | 8/2002 | Kimble et al. | .............. 713/300 |
| 6,480,400 B2 | * | 11/2002 | Wu et al. | ................. 363/21.01 |
| 6,496,390 B2 | * | 12/2002 | Yang | ....................... 363/21.07 |
| 6,510,066 B2 | * | 1/2003 | Giannopoulos et al. | ....... 363/97 |

* cited by examiner

Primary Examiner—Gregory J. Toatley, Jr.
(74) Attorney, Agent, or Firm—Rabin & Berdo, P.C.

(57) ABSTRACT

A power supply system includes a main power regulator, standby power regulator and automatic electronic switch. The main power regulator having a first rectifier outputs a first voltage signal to provide the main power. The standby power regulator having a second rectifier outputs a standby voltage signal to provide the standby power. The automatic electronic switch receives the standby voltage signal in response to a PSON (Power Supply ON) signal and outputs a second voltage signal to alternatively provide the main power.

21 Claims, 3 Drawing Sheets

POWER SUPPLY SYSTEM

This application incorporates by reference of Taiwan application Serial No. 90213347, Filed Aug. 6, 2001.

BACKGROUND OF THE INVENTION

1. Field of the Invention

The invention relates in general to a power supply system, and more particularly to a power supply system having standby power.

2. Description of the Related Art

Formerly, there is only one main power regulator in the power supply and the power supply therefore has to be switched on for supplying power to the computer over a long period of time. Since Intel develops the standard ATX, which is the modern-day shape and layout of PC motherboards, in 1995, the power supply of the ATX motherboard requires two power regulators, that is, adding a standby power regulator.

The traditional power supply provides one output for main power and the other output for standby power. The main power circuit requires a switching regulator for outputting DC (Direct Current) power at +12V, +5V, and +3.3V while the standby power circuit requires another switching regulator for outputting DC power at +5V during power-off.

Referring to FIG. 1, a block diagram of a traditional power supply for generating the power required by the memory system is illustrated. Suspend-to-RAM (STR) occurs when a system detects that most of the applications or system components are under silent operation and enters a low-power state. While in the low power (STR) state, memory system 101 remains powered to retain the system information while most other components turn off to conserve energy. The traditional power supply with standard ATX includes a main power regulator 10 and a standby power regulator 11. When the motherboard supports STR, either the main power regulator 10 or the standby power regulator 11 generates power for the memory system 101. In the normal state, the MOS (Metal Oxide Semiconductor) switch 103 receives switch signal SW1 and becomes open. The main power regulator 10 then provides the memory system 101 with main power MP. In the STR state, the MOS switch 105 receives switch signal SW2 and becomes open. The standby power regulator 11 then provides the memory system 101 with standby power SP. The power supply stops providing any power while the computer shuts down.

Referring to FIG. 2, a block diagram of a traditional power supply system with standard ATX is shown. The alternating current source 201 outputs alternating current power signal AC to the main power regulator 10 and the standby power regulator 11. The main power regulator 10 includes switching controller 203, MOS switch 205, multiple transformer 207, +12V rectifier 208, +5V rectifier 209 and +3.3V rectifier 210. The +12V rectifier 208, +5V rectifier 209 and +3.3V rectifier 210 individually output the voltage signal (or voltage) Out12V, Out5V, and Out3.3V for providing power at +12V, +5V, and +3.3V. The standby power regulator 11 includes switching controller 213, MOS switch 215, transformer 217, +5V rectifier 219. The +5VBS rectifier 219 outputs the standby voltage signal Out5VSB for providing standby power at +5V. The voltage signal Out5V outputted by the +5V rectifier 209 for the main power regulator 10 has the same electric potential with the standby voltage signal Out5VBS outputted by the +5VBS rectifier 219 for the standby power regulator 11. However, the +5V rectifier 209 and +5VBS rectifier 219 belong to different power regulators without electrical connection and therefore it leads to a waste and an unsteady effect for the power regulation.

SUMMARY OF THE INVENTION

It is therefore an object of the invention to provide a power supply system with a simplified structure for the regulators. It reduces the cost and minimizes the whole volume under compatibility and even more reliable and stable for power regulation.

The invention achieves the above-identified objects by providing a power supply system for generating main power and standby power to be applied to a computer that produces a PSON (Power Supply ON) signal. The power supply system includes a main power regulator, standby power regulator, and automatic electronic switch. The main power regulator having a first rectifier outputs a first voltage signal to provide main power. The standby power regulator having a second rectifier outputs a standby voltage signal to provide standby power to the computer when the PSON signal is not produced. The automatic electronic switch receives the standby voltage signal in response to a the PSON signal and outputs a second voltage signal to provide further main power to the computer.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

The main design of the invention is to simplify the main power regulator by removing a rectifier and combine the rectifiers of the main power regulator and the standby power regulator into a rectifying circuit.

Figure 3:
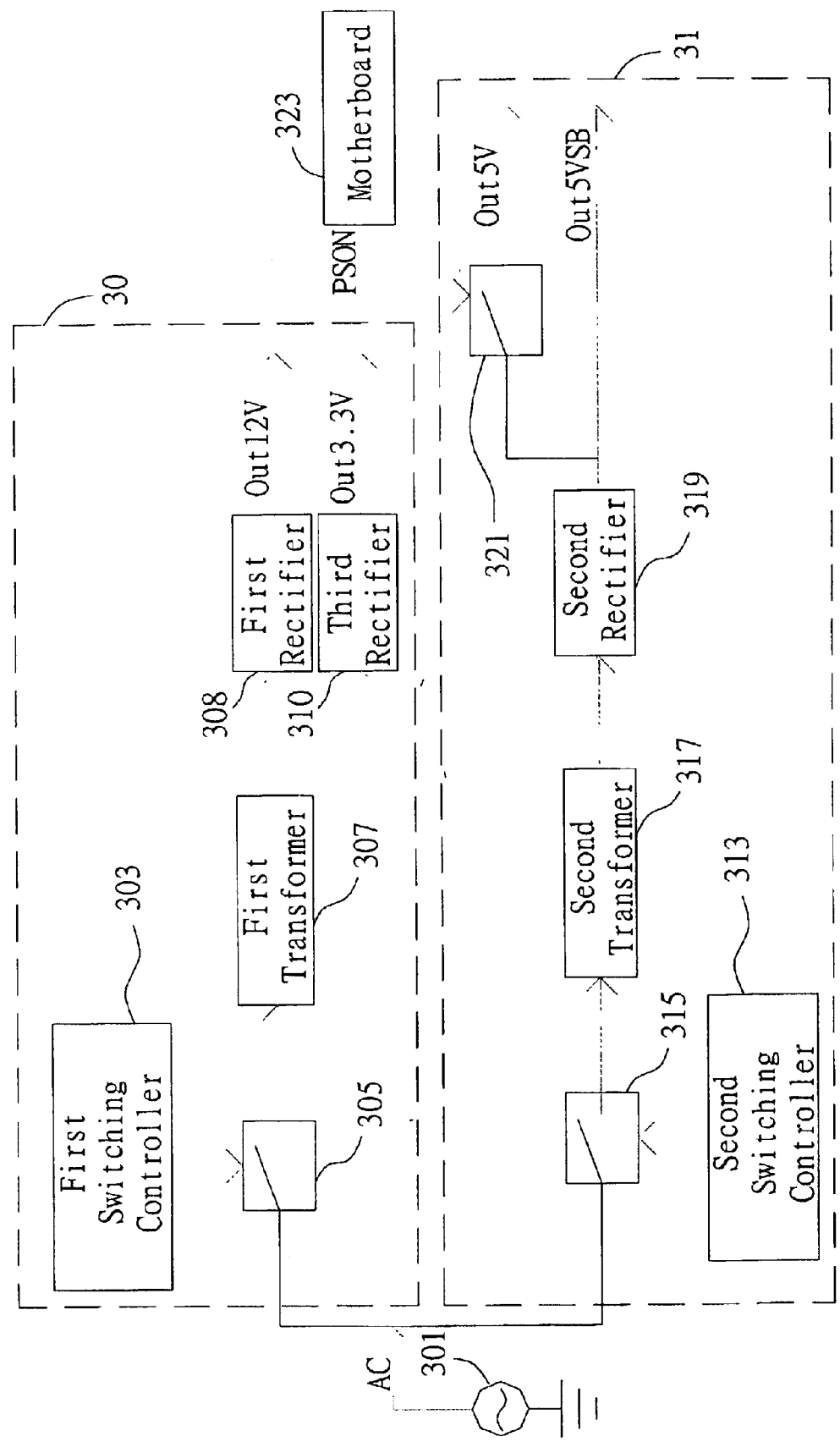
FIG. 3 shows a block diagram of a power supply system according to a preferred embodiment of the invention.

Referring first to FIG. 3, a block diagram of a power supply system according to a preferred embodiment of the invention is shown. The power supply system for generating main power and standby power is applied to a computer that produces a PSON (Power Supply ON) signal. The power supply system includes a main power regulator 30, standby power regulator 31 and automatic electronic switch 321. The main power regulator 30 having a first rectifier 308 outputs a first voltage signal Out12V at +12V to provide the main power to the computer when the PSON signal is produced. The standby power regulator 31 having a second rectifier 310 outputs a standby voltage signal Out5VSB at +5V to provide the standby power to the computer when the PSON signal is not produced. The automatic electronic switch 321 is controlled by a PSON signal from a motherboard 323 of the computer. In response a to the PSON signal, the automatic electronic switch 321 receives the standby voltage signal Out5VBS and outputs a second voltage signal Out5V at +5V to provide further main power to the computer. For example, the standby voltage signal Out5VBS and the second voltage signal Out5V are identical in electric potential of +5V.

The main power regulator 30 further includes a first switching controller 303, first transformer 307 and first electronic switch 305. The first transformer 307 is electrically coupled with the first rectifier 308. The first electronic switch 305 is controlled by the first switching controller 303 and selectively outputs an alternating current signal AC to the first transformer 307. In addition, the main power regulator 30 further includes a third rectifier 310 for outputting a third voltage signal Out3.3V at 3.3V. The first electronic switch 305 is on for generating and outputting direct current by the main power regulator 30.

The standby power regulator 31 further includes a second switching controller 313, a second transformer 317 and a second electronic switch 315. The second transformer 317 is electrically coupled with the second rectifier 319. The second electronic switch 315 is controlled by the second switching controller 313 and selectively outputs the alternating current signal AC to the second transformer 317. The electronic switch 315 is on for generating and outputting direct current by the standby power regulator 31.

More explicitly, when the power supply system proceeds to provide DC power at +12V, the switching controller 303 completes signal switching and then sends a switch signal to the electronic switch 305. The electronic switch 305 is therefore open for inputting the alternating current signal AC to the first transformer 307. After the alternating current signal AC is transformed by the first transformer 307 and rectified by the first rectifier 308, the rectifier 308 outputs the first voltage signal Out12V at +12V for providing DC power at +12V. When the power supply system proceeds to provide DC power at +5V, the motherboard 323 sends a PSON signal to the automatic electronic switch 321. The automatic electronic switch 321 receives the PSON signal and becomes on for receiving the standby voltage signal Out5VBS from the standby power regulator 31. The automatic electronic switch 321 then outputs the standby voltage signal Out5VBS to be the second voltage signal Out5V at +5V. Since the standby power regulator 31 is in the standby state after the computer is turned on, standby power is able to be sent and passes through the electronic switch 315, the transformer 317, and second rectifier 319. Once the automatic electronic switch 321 is on, it becomes an alternative output for a main power to the computer.

According to the construction of the invention, there could be more rectifiers added in the main power regulator 30 to provide power in different electric potentials. As shown in FIG. 3, the main power regulator 30 includes the first switching controller 303, first transformer 307, first rectifier 308 as well as first electronic switch 305 and further includes a third rectifier 310. The first rectifier 308 and third rectifier 310 output a first voltage signal Out12V at +12V and a third voltage signal Out3.3V at 3.3V respectively to provide the DC power at +12V and +3.3V. The standby power regulator 31 includes a second switching controller 313, second electronic switch 315, second transformer 317, second rectifier 319 and automatic electronic switch 321. The second rectifier 319 outputs the standby voltage signal Out5VBS to provide either standby power at +5V or main power at +5V through the automatic electronic switch 321.

As compared with the structure of the traditional power supply system, the +5V rectifier 209 is removed from the main power regulator in the invention. The main power regulator is simplified by the combination of the rectifying circuits in two power regulators corresponding to the rectifier 209 and rectifier 219 and by increasing the power of the standby power regulator 31. Thus, the standby power regulator 31 can provide main power at +5V by simply using the automatic electronic switch 321. It avoids the waste of the power regulator and improves the effect of power regulation.

Figure 1:
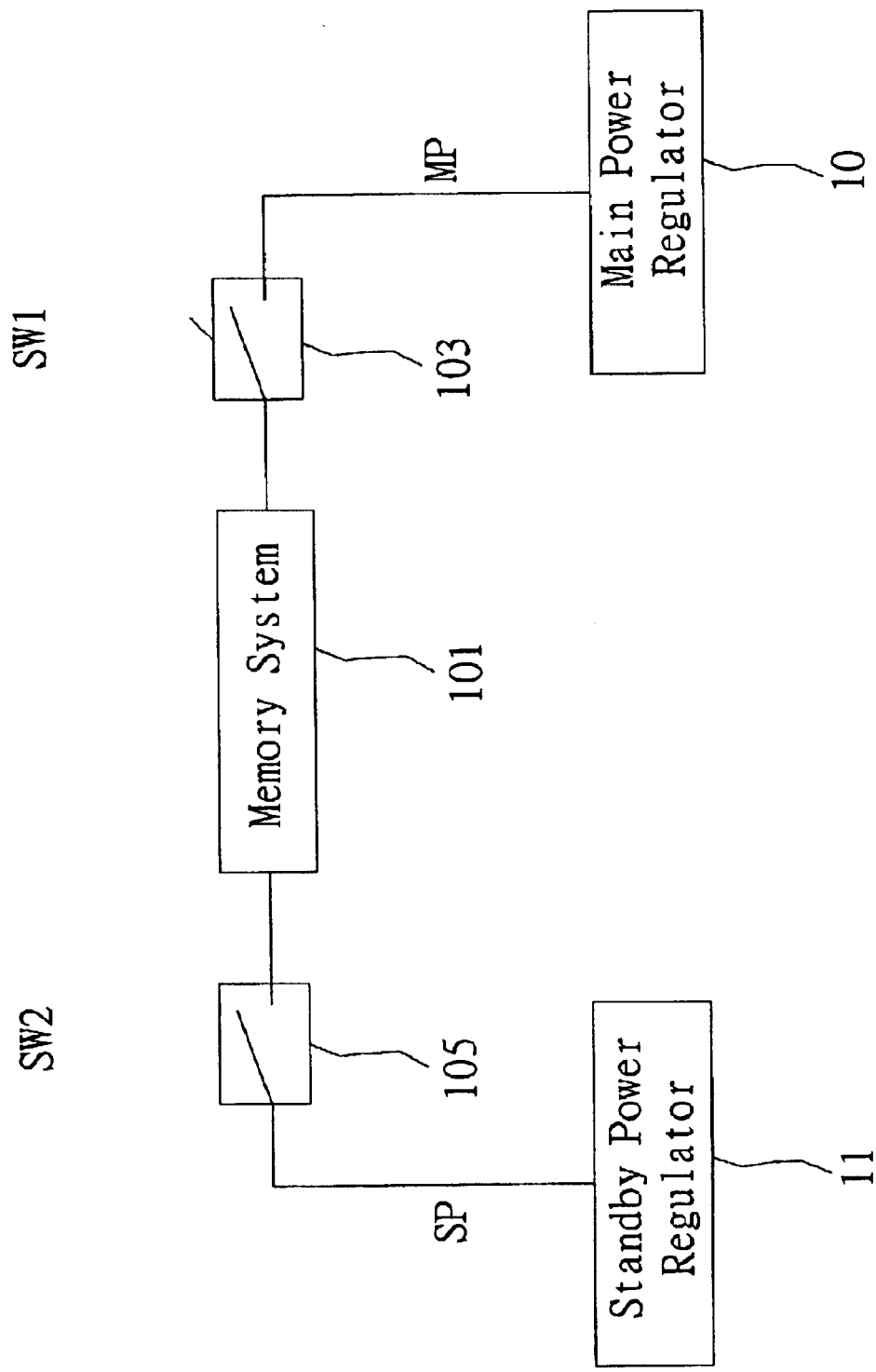
FIG. 1 (Prior Art) illustrates a block diagram of a traditional power supply for generating the power required by the memory system.
Figure 2:
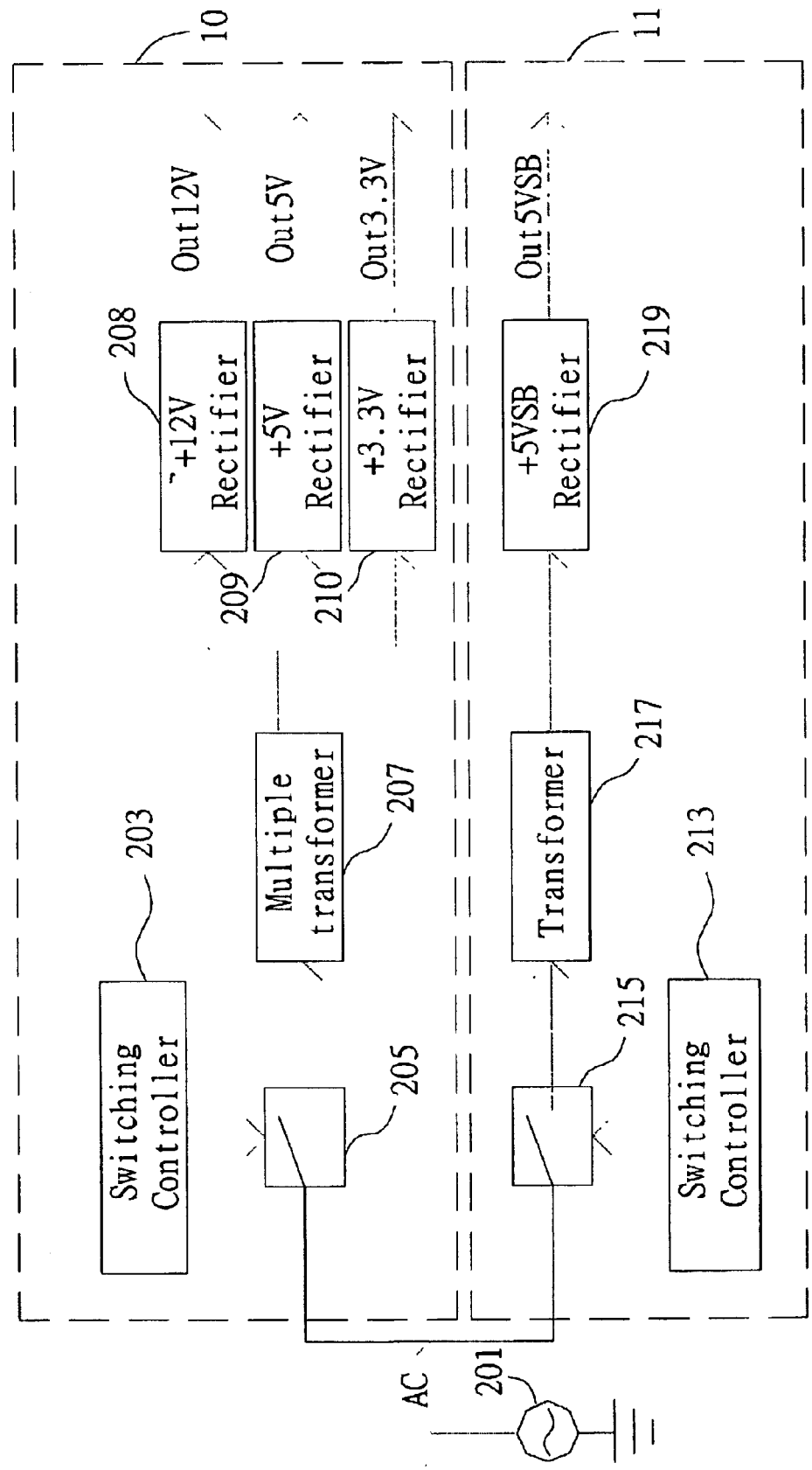
FIG. 2 (Prior Art) shows a block diagram of a traditional power supply system with standard ATX.

Referring to FIG. 2, the output power of the traditional standby power regulator 11 is generally lower than that of the traditional main power regulator 10. For example, the main power regulator 10 carries 20 amperes while the standby power regulator 11 carries 0.2 to 2 amperes. As shown in FIG. 3, in order to provide a main power from the standby power regulator 11 steadily, the output power of the standby power regulator 31 of this invention has to be higher than that of the traditional power regulator 11. The output power of standby power increases by changing the specification of the transformer 317, rectifier 319, switching controller 313 or the like. For instance, it achieves the goal to wind the transformer 317 by thicker coil or adapt durable components for the diode in the rectifier 319 and the transistor in the electronic switch 315. After increasing the output power of the standby power 31, the traditional power regulator corresponding to the rectifier 209 can be replaced by the standby power regulator 31.

Besides, the rectifier at least requires an inductance coil, two-in-one diode and capacitance while the automatic electronic switch only needs a transistor. It therefore simplifies the circuit design and reduces cost according to the invention. The whole volume of the power supply system is minimized as well. Furthermore, the power supply system of the invention is compatible with the standard ATX and even more reliable. When the motherboard supports STR, the standby power regulator enables to generate enough power for the memory. There is no need to require two switches on the motherboard to switch two power regulators but only require one automatic electronic switch for the standby power regulator.

The power supply system according to the invention has the following advantages:
1. It simplifies the circuit design of the power regulator by removing a rectifier and only requires one automatic electronic switch.
2. It reduces the cost since the automatic electronic switch is cheaper than the rectifier.
3. The whole volume of the power supply system is minimized.
4. The power supply system of the invention is compatible with the standard ATX and even more reliable and stable.
5. There is no need to require two switches on the motherboard to switch two power regulators but only require one automatic electronic switch for the standby power regulator.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power supply system for generating main power and standby power to be applied to a computer that produces a PSON (Power Supply ON) signal, the power supply system comprising:

a main power regulator having a first rectifier for outputting a first voltage to provide main power;

a standby power regulator having a second rectifier for outputting a standby voltage, the standby voltage being provided as standby power to the computer when the PSON signal is not produced; and an automatic electronic switch for receiving the standby voltage and outputting a second voltage in response to the PSON signal to provide further main power to the computer.

2. The system according to claim 1, wherein the main power regulator further comprises:

a switching controller;

a transformer electrically coupled with the rectifier; and a further electronic switch controlled by the switching controller and selectively outputting an alternating current signal to the transformer.

3. The system according to claim 2, wherein the main power regulator provides multiple voltages.

4. The system according to claim 3, wherein the multiple voltages include the first voltage and a third voltage, and wherein the electric potential of the first voltage, second voltage and third voltage are respectively +12V, +5V and 3.3V.

5. The system according to claim 1, wherein the standby power regulator further comprises:

a switching controller;

a transformer electrically coupled with the rectifier; and an another electronic switch controlled by the switching controller and selectively outputting the alternating current signal to the transformer.

6. The system according to claim 1, wherein the standby voltage and the second voltage are identical in electric potential.

7. The system according to claim 1, wherein the electric potential of the standby voltage is +5V.

8. The system according to claim 1, wherein the standby power regulator supplies power to a memory of the computer.

9. The system according to claim 2, wherein the PSON signal is output from a motherboard.

10. A system that supplies main power or standby power to a computer having a normal state and a standby state, the system comprising:

a first output line, a second output line, and a third output line for carrying signals to the computer;

a main power regulator for outputting a first voltage to the first output line;

a standby power regulator for outputting a second voltage;

an automatic electronic switch receiving the second voltage from the standby power regulator and controlled by a signal related to whether the computer is to be in the normal state or the standby state, to provide the second voltage to the second output line; and means for providing the second voltage externally of the switch from the standby power regulator to the third output line.

11. The system according to claim 10, wherein the main power regulator provides multiple voltages.

12. The system according to claim 11, wherein the multiple voltages include the first voltage and a third voltage, and wherein the electric potential of the first voltage, second voltage and third voltage are respectively +12V, +5V and 3.3V.

13. The system according to claim 10, wherein the main power regulator further comprises:

a rectifier;

a transformer electrically coupled with the rectifier;

a switching controller; and a further electronic switch controlled by the switching controller and selectively outputting an alternating current signal to the transformer.

14. The system according to claim 10, wherein the standby power regulator further comprises:

a rectifier;

a transformer electrically coupled with the rectifier;

a switching controller; and an another electronic switch controlled by the switching controller and selectively outputting the alternating current signal to the transformer.

15. The system according to claim 10, wherein the standby power regulator supplies power to a memory of the computer.

16. The system according to claim 10, further comprising a computer memory, means connecting the second and third output lines to the memory, the connecting means including a memory switch means that provides the second voltage to the memory to provide power thereto only from the second output line when the computer is in the standby state, and provides the second voltage to the memory to provide power thereto only from the third output line when the computer is in the normal state.

17. A system that supplies power to a first device and a second device of a computer when the computer is in a normal state, and that supplies power only to the second device when the computer is in a standby state, the power supply system comprising:

a first power regulator for providing a first voltage to the first device;

a second power regulator for providing a second voltage;

an automatic electronic switch, receiving the second voltage from the standby power regulator and controlled by a signal related to whether the computer is to be in the normal state or the standby state, to output the second voltage to the second device; and means for outputting the second voltage to the second device along a path external to the automatic electronic switch.

18. The system according to claim 10, further comprising a computer memory as the second device, means coupling the external path to the memory, the external path coupling means including a first memory switch means that provides the second voltage to the memory to provide power thereto only when the computer is in the standby state, and means coupling the automatic electronic switch to the memory, the automatic electronic switch coupling means including a second memory switch means that provides the second voltage to the memory to provide power thereto only when the computer is in the normal state.

19. The system according to claim 17, wherein the electric potential of the first voltage and second voltage is respectively +12V and +5V.

20. The system according to claim 17, wherein the main power regulator further comprises:

a rectifier;

a transformer electrically coupled with the rectifier;

a switching controller; and a further electronic switch controlled by the switching controller and selectively outputting an alternating current signal to the transformer.

21. The system according to claim 17, wherein the standby power regulator further comprises:

a rectifier;

a transformer electrically coupled with the rectifier;

a switching controller; and an other electronic switch controlled by the switching controller and selectively outputting the alternating current signal to the transformer.

* * * * *